United States Patent [19]

Karasaki

[11] Patent Number: 4,845,353
[45] Date of Patent: Jul. 4, 1989

[54] FOCUS DETECTING SYSTEM

[75] Inventor: Toshihiko Karasaki, Sakai, Japan

[73] Assignee: Minolta Camera Kabushiki Kaisha, Osaka, Japan

[21] Appl. No.: 65,762

[22] Filed: Jun. 24, 1987

[30] Foreign Application Priority Data

Jul. 3, 1986 [JP] Japan .................. 61-157698

[51] Int. Cl.⁴ .............................. G01J 1/20
[52] U.S. Cl. .................... 250/201; 354/405
[58] Field of Search .......... 250/201 AF, 204, 201 PF, 250/209, 578; 354/405, 406, 407, 408; 356/1, 4

[56] References Cited

U.S. PATENT DOCUMENTS

| | | | |
|---|---|---|---|
| 3,529,528 | 9/1970 | Leitz | 95/44 |
| 3,708,619 | 1/1973 | Martin | 178/7.92 |
| 3,860,935 | 1/1975 | Stauffer | 354/25 |
| 4,293,205 | 10/1982 | Tokutomi et al. | 354/405 |
| 4,431,285 | 2/1984 | Kajita et al. | 354/405 |
| 4,580,042 | 4/1986 | Tokutomi et al. | 250/201 |
| 4,636,624 | 1/1987 | Ishida et al. | 250/201 |
| 4,660,955 | 4/1987 | Ishida et al. | 354/408 |
| 4,721,975 | 1/1988 | Hamada | 354/408 |

FOREIGN PATENT DOCUMENTS 58-49844 11/1983 Japan .

Primary Examiner—David C. Nelms
Attorney, Agent, or Firm—Burns, Doane, Swecker & Mathis

[57] ABSTRACT

A focus detecting system of a type comprising a transducer element array arranged in a vertical direction for detecting through a reflecting member a standard light flux and a reference light fluxes which have passed through different areas of a plane of an exit pupil of the photo-taking lens. The reflecting member is supported for pivotal movement between a downwardly pivoted position at which both of the standard and reference light fluxes are reflected downwards, and an upwardly pivoted position at which it is retracted out of the optical axis. The reflecting member when in the downwardly pivoted position causes the standard light flux to be reflected at a first reflecting surface area of the reflecting member adjacent the pivot axis and also causes the reference light flux to be reflected at a second reflecting surface area of the reflecting member remote from the pivot axis.

7 Claims, 3 Drawing Sheets

FOCUS DETECTING SYSTEM

BACKGROUND OF THE INVENTION 1. (Field of the Invention)

The present invention relates to a focus detecting system capable of detecting a focusing condition of a photo-taking lens.

2. (Description of the Prior Art)

U.S. Pat. No. 4,636,624 issued in Jan. 13, 1987 discloses such a focus detecting system as shown in FIG. 4 of the accompanying drawings. Referring to FIG. 4, the prior art focus detecting system shown therein includes a condenser lens 3 positioned rearwardly of a photo-taking lens 2 on an optical axis 1, a pair of image forming lenses 4a and 4b positioned rearwardly of the condenser lens 3 and arranged in a symmetrical relationship with each other relative to the optical axis 1, and a pair of line sensors (arrays of photoelectric transducer elements) 5a and 5b arranged on an image forming plane of the image forming lenses 4a and 4b. Reference numeral 6 represents a plane equivalent to a surface of a film to be exposed, and reference numeral 7 represents a correlation detector electrically connected with the line sensors 5a and 5b.

A standard light flux a and a reference light flux b passing respectively through different areas 2a and 2b of an exit pupil of the photo-taking lens 2 are sensed by the associated line sensors 5a and 5b which convert patterns of distribution of light into respective electric signals, said electric signals being in turn applied to the correlation detector 7 to determine the correlation in position between the images formed on the associated line sensors 5a and 5b for carrying out an automatic focus detection. The correlation detector 7 subsequently generates a defocus signal which is utilized to move the photo-taking lens 2 back and forth by means of a drive mechanism for the purpose of an automatic focus adjustment.

Where the focus detecting system of the above described construction is incorporated in a single reflex camera, a main mirror 8 upwardly inclined at an angle of 45° and an auxiliary mirror (a reflecting member) inclined downwardly at an angle of 45° are provided on the optical axis 1 between the photo-taking lens 2 and the film equivalent surface 6 so that a photo-taking light flux having passed through the photo-taking lens 2 can be reflected upwardly by the main mirror 8 so as to travel towards a finder optical system and, on the other hand, a focus detecting light flux having passed through a semitransparent mirror area of the main mirror 8 can be reflected downwards by the auxiliary mirror 9 so as to reach the line sensors 5a and 5b.

And, during the actual photo-taking, both of the main mirror 8 and the auxiliary mirror 9 are pivoted upwardly so as to retract out of the optical axis to permit the photo-taking light flux having passed through the photo-taking lens 2 to impinge upon a surface of the film so as to form thereon an image of a target object to be photographed, thereby giving an exposure to the film.

On the other hand, since the line sensors 5a and 5b are merely oriented horizontally relative to the photo-taking lens 2 at a position containing the optical axis 1, it has been found that the automatic focus detection of, for example, a horizontal line is impossible. In order to obviate this problem, the inventor notices an improved focus detecting system so designed as to accomplish the focus detection not only in the horizontal direction, but also in the vertical direction and as to enable the system to perform the automatic focus detection of, for example, the horizontal line. The improved focus detecting system is of a construction wherein the line sensors are comprised of a plurality of line sensors having different positions and directions, some of them being arranged in a horizontal position which contains the optical axis, while the remaining ones are arranged in a vertical position which does not contain the optical axis.

Where the line sensors are arranged in the vertical position, the auxiliary mirror 9 must have a substantial length in order for the focus detecting light flux to be effectively reflected. However, since the length between a point of intersection between the optical axis 1 and the auxiliary mirror 9 and an upper portion (on the side of a pivot axis) is limited by the main mirror 8 and cannot, accordingly, be increased. Because of this, the necessity arises that the main mirror 8 has to be moved forwards.

The forward movement of the main mirror 8 results in increase of the thickness of a camera body, thereby posing a problem associated with the compactness of the camera as a whole.

SUMMARY OF THE INVENTION

The present invention has been devised with a view to eliminating the above discussed problems and is based on the finding that, of the focus detecting light flux, a standard light flux is small and a reference light flux is large, and, accordingly, the present invention has for its object to provide an improved focus detecting system wherein the focus detecting light flux can be effectively reflected with no increase of the thickness of the camera body being accompanied.

In order to accomplish the above described object, the present invention is directed to a focus detecting system of a type wherein for focus detection a photoelectric transducer element array arranged in a vertical direction is used to detect through a reflecting member a standard light flux and a reference light flux which have passed through different areas of a plane of exit pupil of the photo-taking lens. In accordance with the present invention, the reflecting member is supported in alignment with the optical axis for pivotal movement about a pivot axis between a downwardly pivoted position, at which both of the standard and reference light fluxes are reflected downward, and an upwardly pivoted position at which it is retracted out of the optical axis. When the reflecting member is in the downwardly pivoted position, the standard light flux can be reflected at a first reflecting surface area of the reflecting member adjacent the pivot axis, and the reference light flux can be reflected at a second reflecting surface area of the reflecting member remote from the pivot axis.

BRIEF DESCRIPTION OF THE DRAWINGS

This and other objects and features of the present invention will become clear from the following description taken in conjunction with a preferred embodiment thereof with reference to the accompanying drawings, in which.

DETAILED DESCRIPTION OF THE EMBODIMENT

Figure 1:
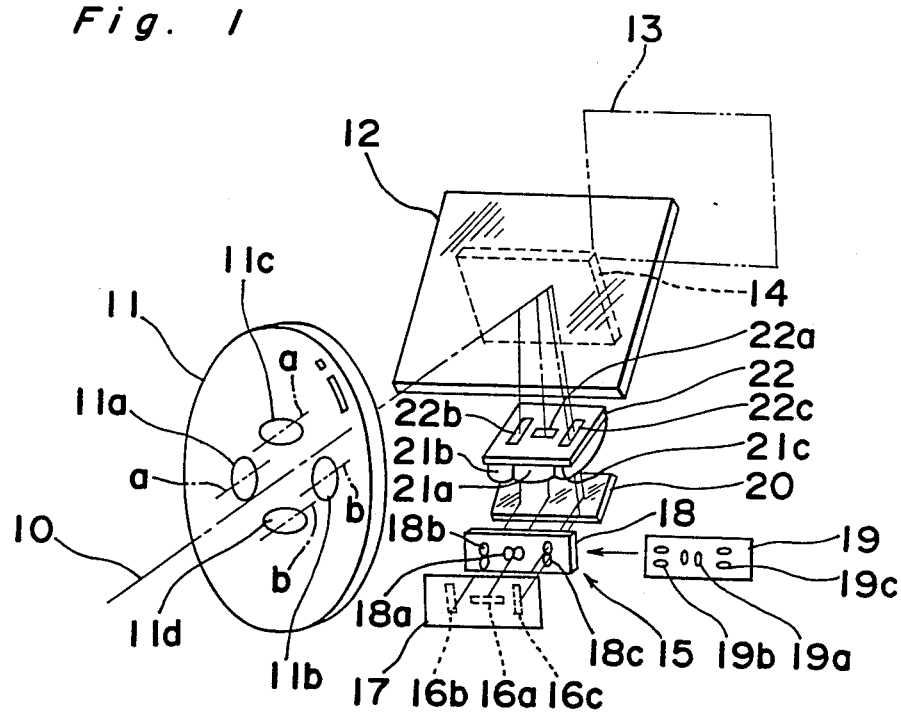
FIG. 1 is a perspective view of an focus detecting system according to the present invention.
Figure 2:
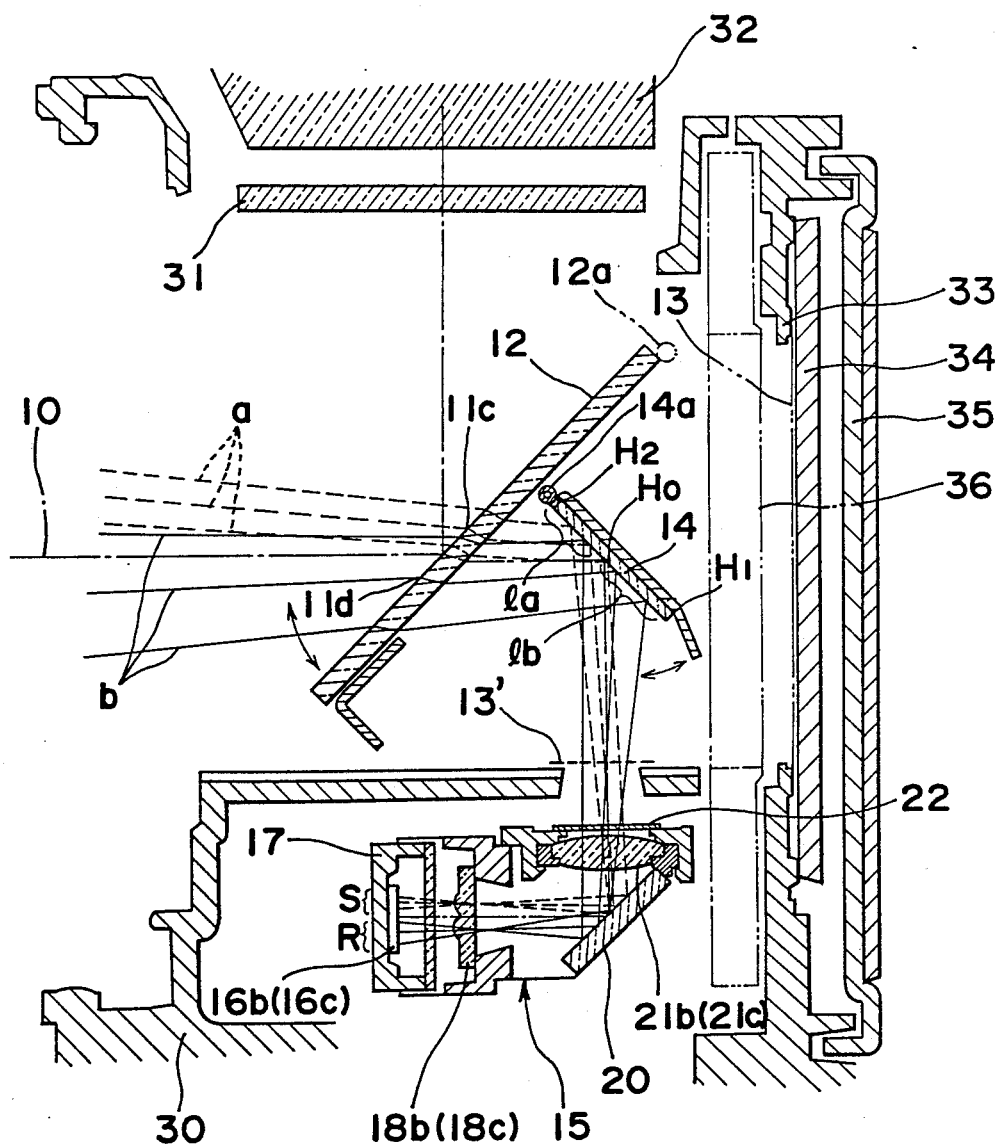
FIG. 2 is a sectional view of FIG. 1.

Referring now to FIGS. 1 and 2, a camera body 30 of a single lens reflex camera is provided with a photo-taking lens 11 on an optical axis 10, a main mirror 12 positioned rearwardly of the photo-taking lens 11 and inclined upwardly at 45°, and a film exposing plane 13 positioned rearwardly of the main mirror 12 so that a photo-taking light flux having passed through the photo-taking lens 11 can be upwardly reflected by the main mirror 12 to form an image on a focusing plate 31 and be further guided towards a finder optical system (not shown) through a pentagonal roof-prism 32.

The main mirror 12 has at least a portion thereof formed as a semitransparent mirror, and between the semitransparent mirror portion of the main mirror 12 and the film exposing plane 13 is provided an auxiliary mirror 14 having a pivot shaft 14a journalled to a rear surface portion of the main mirror 12 and inclined downwardly at 45°. A focus detecting light flux which has passed through the semitransparent mirror portion of the main mirror 12 can be reflected by the auxiliary mirror 14 so as to travel downwards and then towards a focus detecting device 15 positioned below a mirror box of the camera body 30.

During the actual photo-taking, both of the main mirror 12 and the auxiliary mirror 14 are swung upwardly about pivot shafts 12a and 14a, respectively, so as to retract out of the optical axis 10, permitting the photo-taking light flux having passed through the photo-taking lens 11 to fall on the film exposing plane 13 so that the latter can be exposed.

As best shown in FIG. 2, the camera body 30 is also provided with an aperture gate 33, a film pressing plate 34 for pressing the film against the aperture gate 33, a back cover 35 for the camera body 30, and a focal plane shutter unit 36 arranged in front of the aperture gate 33, reference numeral 13' representing a film equivalent plane.

The focus detecting device 15 is provided with a sensor substrate 17 carrying line sensors (arrays of photoelectric transducer elements) 16a, 16b and 16c which may be, for example, charge-coupled devices. Of these line sensors, the line sensor 16a is arranged in a horizontal position containing the optical axis 10, and the remaining line sensors 16b and 16c are arranged on respective sides of the line sensor 16a in respective vertical positions each not containing the optical axis 10. The line sensors 16b and 16c are laid at about 90° relative to the line sensor 16a.

A separator lens plate 18 integrally formed with separator lenses 18a, 18b and 18c corresponding respectively to the line sensors 16a, 16b and 16c is positioned frontwardly of the sensor substrate 17.

An aperture mask 19 is disposed in front of the separator lens plate 18, which mask 19 is formed with apertures 19a, 19b and 19c corresponding respectively to the separator lenses 18a, 18b and 18c. Between the auxiliary mirror 14 and the aperture mask 19 is disposed a reflecting mirror 20 for reflecting and guiding the focus detecting light flux, which has been reflected by the auxiliary mirror 14 so as to travel downward, towards the line sensors 16a to 16c through the apertures 19a to 19c of the aperture mask 19 and then through the separator lenses 18a to 18c.

Positioned between the reflecting mirror 20 and the auxiliary mirror 14 is condenser lenses 21a, 21b and 21c confronting the apertures 19a to 19c of the aperture mask 19, and a field mask 22 having openings 22a, 22b and 22c for separating the focus detecting light flux so as to coordinate respectively with the line sensors 16a to 16c having different positions and directions is disposed above respective upper surface of the condenser lenses 21a to 21c.

Figure 4:
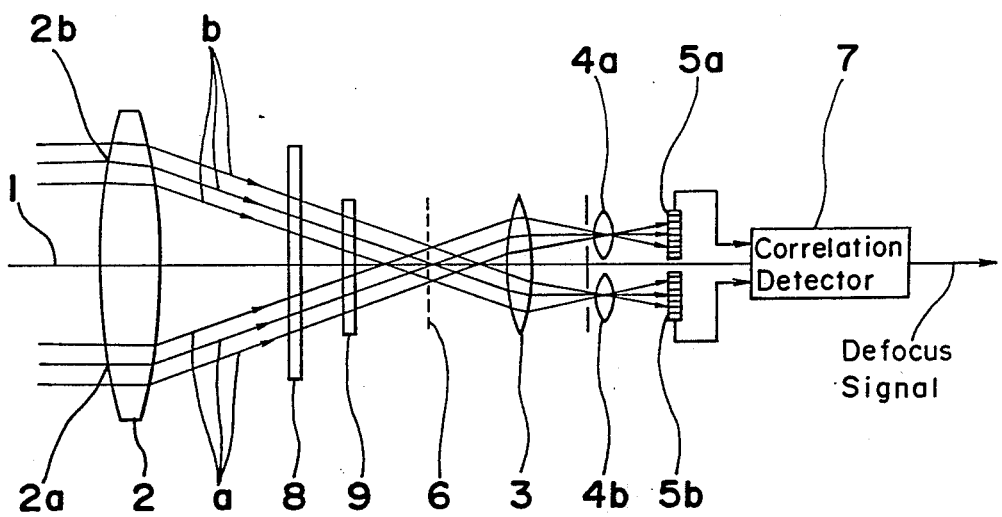
FIG. 4 is a side sectional view of the prior art focus detecting system.

In this construction, as is the case with the prior art system shown in FIG. 4, standard light fluxes a (shown by the broken lines) and reference light fluxes b (shown by the solid lines) passing through different areas 11a, 11b and 11c, 11d of a plane of the exist pupil of the photo-taking lens 11 are received by the individual line sensors 16a to 16g, which line sensors subsequently convert patterns of distribution of light of respective images into associated electric signals which are then supplied to the correlation detector. The correlation detector then determines the correlation of these output signals from the line sensors 16a to 16c for the focus detection and subsequently outputs to a lens drive mechanism a defocus signal necessary to cause the lens drive mechanism to move the photo-taking lens 11 back and forth for the focus adjustment.

According to the prior art shown in and described with reference to FIG. 4, only the line sensors (5a and 5b) which correspond to the line sensor 16a arranged in the horizontal position according to the present invention are employed and, therefore, no automatic focus detection of, for example, a horizontal line has been possible. In contrast thereto, according to the illustrated embodiment of the present invention, since in addition to the line sensor 16a in the horizontal position the line sensors 16b and 16c arranged in the vertical position are employed as shown, focus detection in both of the horizontal and vertical directions can be achieved simultaneously and, therefore, the focus detection of, for example, the horizontal line is possible.

Figure 3:
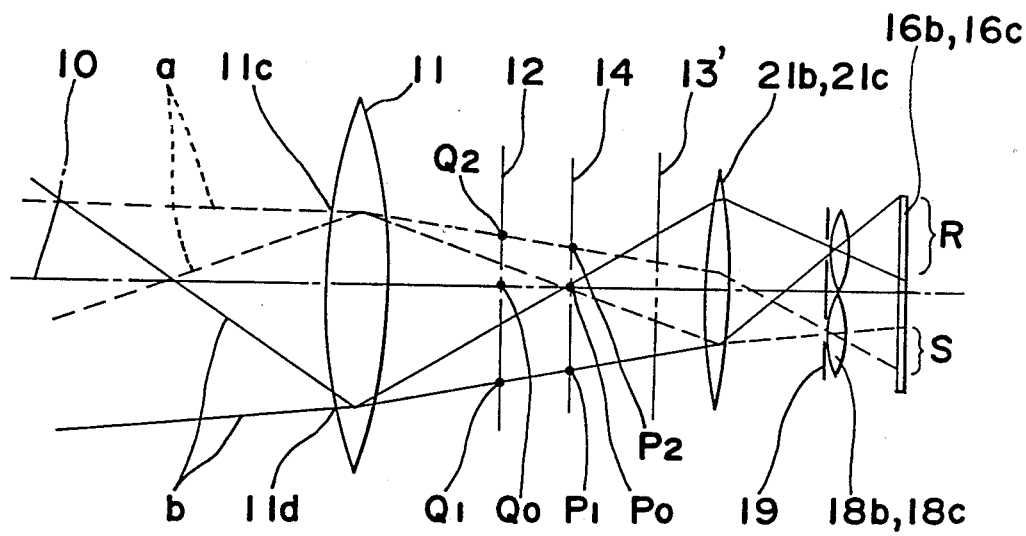
FIG. 3 is a diagram showing an equivalent optical system of FIG. 1.

On the other hand, as shown also in FIG. 3 of the focus detection light flux received by the line sensor 16b (or 16c) arranged in the vertical position, the width of the standard light flux a shown by the broken line is set to be small and that of the reference light flux b shown by the solid line is set to be large.

The reason that the number of picture elements of a reference region R of the line sensor 16b (or 16c) is selected to be greater than that of a standard region S thereof is because, with the standard region S taken as one block, comparison of an image with the total picture elements of the reference region R can be accomplished to obtain both of the defocus amount and the defocus direction not only in the vicinity of an in-focus position, but also even when a large defocus occurs, thereby enabling the calculation of the correlation to be performed.

Accordingly, the distance from the optical axis 10 to ends $Q_2$, $P_2$, . . . of the standard light flux a is smaller than the distance from the optical axis 10 to ends $Q_1$, $P_1$, . . . of the reference light flux b ($Q_1Q_0 > Q_1Q_0$, $P_1P_0 > P_2P_0$).

To describe this in terms of the position of the auxiliary mirror 14 shown in FIG. 2, the length la between the point $H_0$ of intersection with the optical axis 10 and an upper end $H_2$ in the vicinity of the pivot shaft 14a is restricted by the main mirror 12. If the main mirror 12 is moved forwards in order to increase this length la, not only does the thickness of the camera body 30 increase, but also the position of the focusing plate is required to be shifted upward, and, accordingly, it is not wise to move the main mirror 12 forwards.

Conversely, the length lb between the point $H_0$ of intersection with the optical axis 10 and a lower end $H_1$ remote from the pivot shaft 14a can be extended to the neighborhood of the focal plane shutter unit 36.

In view of the foregoing, if arrangement is made that the small standard light flux a can be reflected by a reflecting surface area (mainly an area between $H_0$ and $H_2$) of the auxiliary mirror 14 adjacent the pivot shaft 14a and the large reference light flux b can be reflected by a reflecting surface area (mainly an area between $H_0$ and $H_1$) of the auxiliary mirror 14 remote from the pivot shaft 14a, the focus detecting light flux a and b can be effectively reflected with no need to move the main mirror 12 forwards and also no need to lengthen the auxiliary mirror 14.

While in the foregoing embodiment reference has been made to the line sensors 16a to 16c arranged in the horizontal and vertical positions, it may be of a structure wherein only one line sensor is arranged in the vertical position containing the optical axis.

As a method for carrying out a focus adjustment of the photo-taking lens according to the output from each of the line sensors 16a to 16c, there are some methods, one of which is to effect the focus adjustment on the basis of an output from one of the line sensors which has exhibited the highest contrast of all of the contrasts of the respective images, formed on the associated line sensors, which contrasts are detected according to the outputs from the associated line sensors. Another method is to effect the focus adjustment according to the output from one of the line sensors which detects the target object closest to the camera.

From the foregoing description, it has now become clear that, according to the present invention, the reflecting member for reflecting downwards both of the standard and reference light fluxes which have passed through the photo-taking lens is of such a design that, when the reflecting member is in the downwardly pivoted position, the standard light flux can be reflected at the first reflecting surface area of the reflecting member adjacent the pivot axis, and the reference light flux can be reflected at the second reflecting surface area of the reflecting member remote from the pivot axis. Accordingly, the focus detecting light flux between the point of intersection with the optical axis and the upper end of the reflecting member adjacent the pivot axis.

Therefore, since there is no need to move the main mirror or the like forwards and there is no possibility of the thickness of the camera body or the like being increased, there is no obstruction to the compactness of the camera or the like.

In addition, since the focus detecting light flux can be effectively reflected by the reflecting surface areas of the reflecting member, no vignetting occur and the focusing accuracy can be improved.

What is claimed is:

1. A focus detecting system for detecting focusing condition of a photo-taking lens, comprising;
    means for reflecting light passed through the photo-taking lens in a first position, said reflecting means being rotatable to a second position with respect to a predetermined rotatable axis for retracting from an area through which photo-taking light passes for photographing, and said reflecting means including a first portion located nearby the rotational axis and a second portion located far from the rotational axis, said first portion being smaller than said second portion;
    means for receiving light reflected by the reflecting means located at the first position, said receiving means including a first receiving portion for receiving light reflected by the first portion of the reflecting means and a second receiving portion for receiving light reflected by the second portion of the reflecting means, said receiving means further including a plurality of light receiving elements arranged in a direction perpendicular to the rotational axis of the reflecting means; and
    a calculating means for calculating defocus of the photo-taking lens by comparing the light receiving condition of the first receiving portion of the receiving means with that of the second receiving portion thereof.

2. A focus detecting system as claimed in claim 1, wherein the number of the light receiving elements included in the first receiving portion is smaller than that included in the second receiving portion.

3. A focus detecting system as claimed in claim 1, wherein the first portion of the reflecting means reflects light having passed a first area defined in an exit pupil of the photo-taking lens while the second portion of the reflecting means reflects light having passed through a second area which is different from the first area in the exit pupil.

4. A focus detecting system as claimed in claim 1, further comprising a main mirror for reflecting light passed through the photo-taking lens to guide the light towards a finder optical system, and means for pivotally supporting the reflecting means by the main mirror at the rearward side of the main mirror.

5. A focus detecting system for detecting focusing condition of a photo-taking lens, comprising:
    means for reflecting light passed through the photo-taking lens with an optical axis of the photo-taking lens in a first position, said reflecting means being rotatable to a second position with respect to a predetermined rotatable axis for retracting from an area through which photo-taking light passes for photographing, and said reflecting means including a first portion located nearby the rotational axis and a second portion location far from the rotational axis;
    first means, located at a position through which the reflected optical axis of the photo-taking lens passes, for receiving light reflected by the reflecting means, said first receiving means including a plurality of light receiving elements arranged perpendicularly to the optical axis;
    second means, for receiving light reflected the reflecting means, including,
        a first receiving portion, containing a plurality light receiving elements arranged perpendicularly to the plurality of light receiving elements of the first receiving means, for receiving light reflected by the first portion of the reflecting means, and
        a second receiving portion, containing a plurality of light receiving elements arranged perpendicularly to the plurality of light receiving elements of the first receiving means, for receiving light reflected by the second portion of the reflecting means, said plurality of light receiving elements contained in the first and second receiving portions being arranged perpendicularly to the rotational axis of the reflecting means; and means for calculating defocus of the photo-taking lens on the basis of outputs of the plurality of light receiving elements in the first and second receiving means.

6. A focus detecting system as claimed in claim 5, wherein said second receiving means is located at a position through which the reflected optical axis does not pass.

7. A focus detecting system as claimed in claim 6, further comprising;

third means, located at a position symmetrical with the second means with respect to the optical axis, for receiving light reflected by the reflecting means, including, a first receiving portion, containing a plurality of light receiving elements arranged perpendicularly to the plurality of light receiving elements of the first receiving means, for receiving light reflected by the first portion of the reflecting means, and a second receiving portion, containing a plurality of light receiving elements arranged perpendicularly to the plurality of light receiving elements of the first receiving means, for receiving light reflected by the second portion of the reflecting means.

* * * * *